INVENTOR
TSUNEO KOSUGI
SEIICHI TAKASHIMA
BY Louis Bernat
ATTORNEY

INVENTOR
TSUNEO KOSUGI
SEIICHI TAKASHIMA
BY
ATTORNEY

1

3,423,523
SYNCHRONOUS MOTOR PHASE CONTROL SYSTEM

Tsuneo Kosugi and Seiichi Takashima, Yokohama, Japan, assignors to Victor Company of Japan, Limited, Yokohama, Japan, a corporation of Japan Filed Mar. 31, 1965, Ser. No. 444,245
Claims priority, application Japan, Apr. 1, 1964, 39/18,230
U.S. Cl. 178—6.6 4 Claims
Int. Cl. H04n 5/76

ABSTRACT OF THE DISCLOSURE

The invention provides for the control of a synchronous motor used for driving a pair of magnetic heads which play back signals that are recorded in oblique paths across a magnetic tape. Control signals are also recorded along an edge of the tape. A comparison circuit compares the control signals on the tape with an output reading taken from a slip ring on a shaft which rotates in unison with the heads. An AC signal powering the synchronous motor is shifted in frequency whenever the comparison circuit detects a loss of synchronism between the control signal and the slip ring reading.

This invention relates to a synchronous motor control system and more particularly to a system for controlling a synchronous motor which drives magnetic heads of a system for recording and reproducing television video signals or the like. The system of this invention controls the motor with a high degree of accuracy and reliability and produces high fidelity recording and reproducing.

Magnetic recording and reproducing systems are known wherein two magnetic heads are supported at diametrically opposite points of a rotatable disc for engagement with a magnetic tape which is guided for movement in a helical path about the slightly more than one-half of the periphery of the disc such that the heads trace oblique paths across the tape. Such systems are used for recording and reproducing television video signals, for example, and the rotation of the heads is preferably synchronized with the television signal in a manner such that a field of the television signal is recorded on each track.

Although such systems have been generally satisfactory, it has been difficult to obtain an exact balanc between the performance of the two heads, even when great care is used in the construction and mounting thereof, and distortions in the reproduced picture have resulted. It is found that the difficulties are increased when the same head is not used for both recording and reproducing a given track. Thus if the tracks recorded by a first head are reproduced by a second head to effect a reverse track reproduction, the tracking may not be accurate, the signal to noise ratio is reduced and high frequency components are not reproduced. Such inaccuracies in tracking may be produced when one head is not exactly diametrically opposite the other and when the heads have different heights and/or have gaps inclined at different angles.

It has heretofore been proposed to provide a manually operable switch to temporarily shift the motor driving frequency until the proper phase relationship is obtained. However, this proposed arrangement makes control of the apparatus more difficult and complex, and requires more skill on the part of the operator.

This invention was evolved with the general object of providing a drive system for a magnetic recording and reproducing system, eliminating the disadvantages of prior systems.

2

Another object of the invention is to provide a system utilizing a synchronous drive motor and operative to maintain a phase locked relation between the rotation of an element and the cyclic control signal.

A more specific object of the invention is to provide a two head system for magnetically recording and reproducing a standard television signal, using a 60-cycle synchronous drive motor for rotating the heads, and operative to insure that the heads respectively trace predetermined tracks on the tape.

Still another object of the invention is to provide a system utilizing comparatively simple and inexpensive components and circuitry for controlling a synchronous motor in a manner to obtain a desired phase-locked relation between an element driven by the motor and a control signal.

According to an important feature of this invention, a magnetic recording and reproducing system is provided including a head assembly having a plurality of co-rotatable equi-angularly spaced heads for tracing tracks on a movable magnetic tape, and a control signal is recorded on the tape wherein one cycle of the control signal corresponds to one revolution of the head assembly. A synchronous motor is provided for driving the head assembly and means are provided for energizing the motor in a phase-locked relation to the control signal such that the head assembly is at a certain angular position when the control signal is at a certain point in the cycle thereof. With this arrangement, the heads respectively trace predetermined tracks of the tape.

According to another important feature of the invention, oscillator means are provided for applying an AC current to a synchronous motor, the AC current being synchronized to a cyclic control signal but being at a frequency equal to an integer multiple of the frequency of the control signal, and means are provided operative to temporarily change the frequency of the AC current when the rotation of the element is out of phase locked relation to the cyclic control signal, and to allow the phase to change to a point such that the element is at a certain angular position when the control signal is at a certain point in the cycle thereof.

A specific feature of the invention is in the provision of a special slip-ring assembly including a shorting ring for sensing when the operation is not in the desired phase-locked relation, and for then modifying the control to obtain the desired relation.

This invention contemplates other objects, features and advantages which will become more fully apparent from the following detailed description taken in conjunction with the accompanying drawings which illustrate a preferred embodiment and in which.

Figure 1:
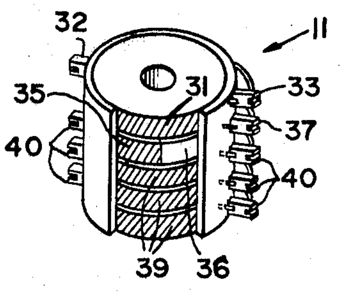
FIGURE 1 is a perspective view of a special slip-ring assembly constructed according to the principles of this invention.

Although having other applications, the synchronous motor control system of this invention is particularly designed for use in a magnetic recording and reproducing system which is generally designated by reference numeral 10 in FIGURE 2, and which includes a slip ring assembly 11 illustrated in detail in FIGURE 1 and having certain special features, as described hereinafter. The slip ring assembly 11 is associated with a four pole synchronous motor 12 which is illustrated in detail in FIGURE 3 and described hereinafter.

In the system 10 as diagrammatically illustrated, the four pole synchronous motor 12 has a shaft 13 which carries a disc 14 on which a pair of magnetic heads 15 and 16 are carried at diametrically opposite positions. The heads 15 and 16 are arranged to trace tracks across a magnetic tape 18, the tape 18 being preferably guided in a helical path about slightly more than half the periphery of the disc, such that the tracks extend obliquely across the tape. The system 10 is preferably used for recording and reproducing a television video signal and the heads may be rotated at a speed of 30 revolutions per second such that one field of the signal is recorded on each track, assuming a standard field frequency of 60 per second.

To obtain good reproduction of the information recorded on the tape, it is desirable that the heads 15 and 16 trace along the tracks recorded on the tape 18. Furthermore, and in accordance with this invention, it is desirable that each head should trace along the same track which it traced in the recording operation. To control such tracking a magnetic head 19 is provided for recording a control signal along an edge portion of the tape 18, as illustrated diagrammatically in the upper portion of FIGURE 2, and for also reproducing the control signal to control rotation of the heads 15 and 16 during reproduction, as hereinafter described. In accordance with this invention, the control signal has a frequency corresponding to the rate of rotation of the heads, i.e., a frequency of 30 cycles per second when recording and reproducing a standard television signal with two heads.

In the recording operation, a standard television video signal may be applied to an input terminal 20 to be applied to a synchronizing signal separator circuit 21 which developes and applies a 60 cycle per second synchronizing signal to a bistable multivibrator or flip-flop 22, operative to develop a 30 cycle per second square wave signal. This square wave signal is applied through a record-reproduce selector switch 23 to the head 19 to be recorded on the edge of the tape 18 and is also applied through another record-reproduce selector switch 24 to one input of a phase comparator circuit 25. The phase comparator circuit 25 controls an oscillator 26 which operates at a frequency of about 60 cycles per second. The output of the oscillator 26 is applied to a phase splitter circuit 27 operative to develop two output signals in 90 degree phase relations, such signals being applied through a power amplifier 28 to phase windings of the four pole synchronous motor 12, which operates to rotate the heads at a speed of about 30 revolutions per second.

It is highly desirable that the rotation of the heads be synchronized to the vertical synchronizing signal component of the input television signal to cause recording of that component at the end or beginning of a track on the tape, to coincide with switching between the heads. To obtain such synchronization, the 60 cycle output of the oscillator 26 is fed back through a phase adjust circuit 29 to an input of the phase comparator which then operates to compare the 60 cycle feed back signal with the 30 cycle square wave from flip-flop 22 and to control the oscillator 26 to maintain such synchronization.

With the system as thus far described, such synchronization could be maintained at two different phase relations between the 60 and 30 cycle signals, to affect the relation of the operation of the heads 15 and 16 to the recorded 30 cycle square wave control signal. With one phase relation, for example, the head 15 might be engaged with the tape during the positive half cycle of the square wave while head 16 would be engaged with the tape during the negative half cycle. With the other phase relation, the heads 15 and 16 would be engaged with the tape during the negative and positive half cycles.

In accordance with this invention, means are provided to insure that the operation of each head always corresponds to a certain polarity of the control signal. In particular, the phase comparator 25 has a third input connected to the slip ring assembly to be controlled in accordance with the rotation of the heads 15 and 16. In operation, if the phase relationship is proper, the phase comparator 25 operates as above described to maintain the existing phase relationship between the 60 cycle output of the oscillator and the 30 cycle square wave signal. If, however, the phase relationship is not proper the phase comparator does not operate in its normal fashion, but allows the frequency of oscillator 26 to increase to the speed of the motor 12 until the proper phase relation is obtained.

In reproducing, switches 23 and 24 are operated to positions opposite those illustrated, to connect the head 19 through an amplifier 30 to the phase comparator, so that the rotation of the heads 15 and 16 is synchronized to the reproduced control signal, rather than to the synchronizing pulses of the television video signal.

Figure 2:
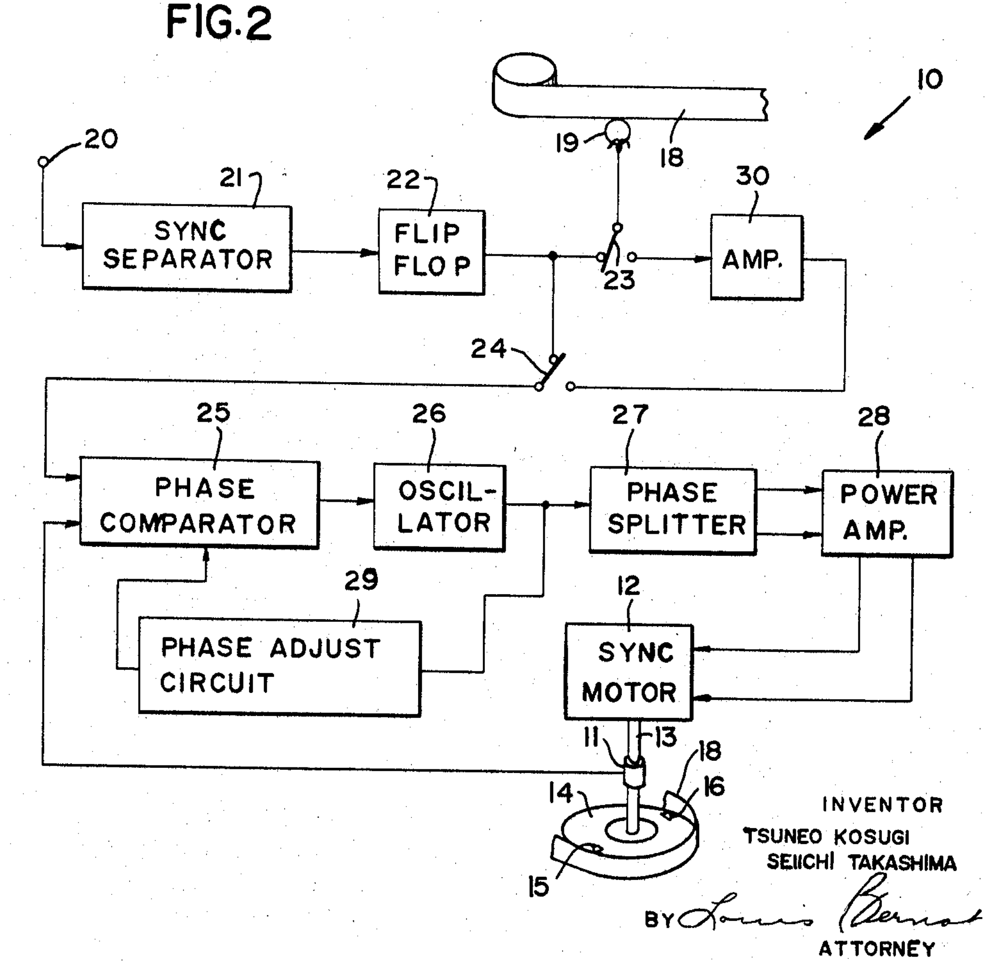
FIGURE 2 is a schematic diagram of a magnetic recording and reproducing system utilizing the slip-ring assembly of FIGURE 1.

Referring now to FIGURE 1, the slip ring assembly 11 comprises an annular member 31 of conductive material which is keyed to the shaft 13 of the synchronous motor 12 to be rotated thereby. Brushes 32 and 33 are supported on a fixed sleeve member 34 to be resiliently engaged with the peripheral surface of the annular member 31. A semi-annular member 35 of conductive material, together with a mating annular member 36 of non-conductive material, are also keyed to the motor shaft 13 for engagement by a brush 37 carried by the sleeve 34. The brushes 32 and 33 are electrically connected to ground, and the annular member 31 is electrically connected to the semi-annular member 35, so that the brush 37 is electrically connected to ground during one-half of each revolution of the motor shaft. Additional annular members 39 may be incorporated in the slip ring assembly 11 for electrical connection to the magnetic heads 15 and 16 and for engagement with brushes 40 for connection to the outputs of recording amplifiers and inputs of reproducing amplifiers.

Figure 4:
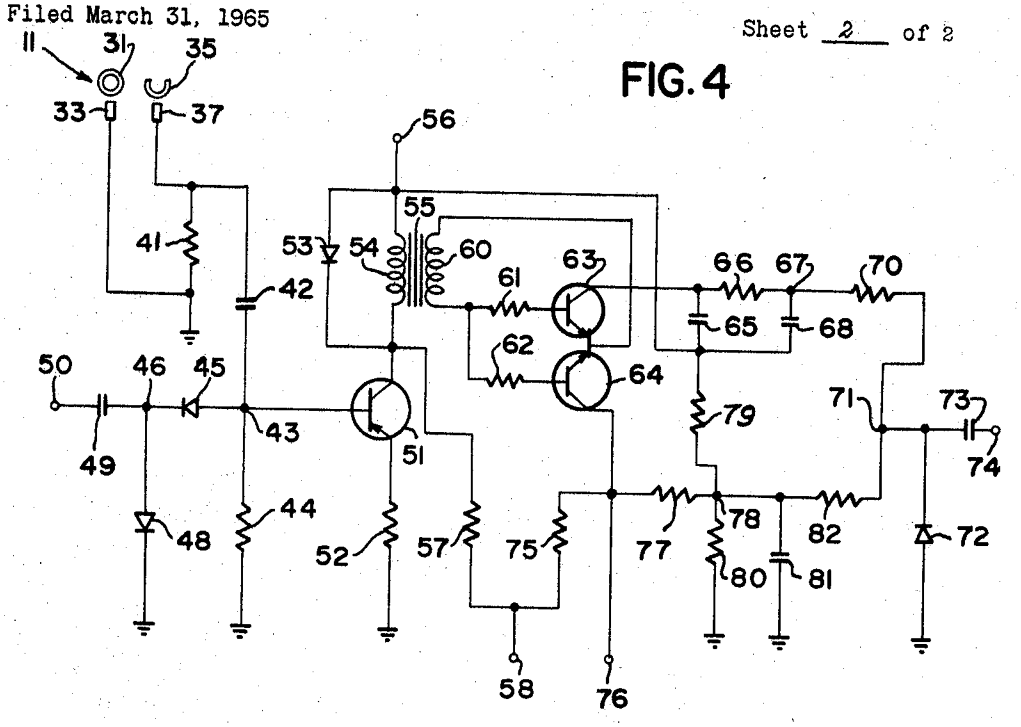
FIGURE 4 is a circuit diagram of a phase comparator circuit of the system of FIGURE 2.

As shown in FIGURE 4, the brush 37 is connected through a resistor 41 to ground and through a capacitor 42 to a circuit point 43 which is connected through a resistor 44 to ground and through a diode 45 to a circuit point 46, connected through a diode 48 to ground and through a capacitor 49 to a terminal 50.

Terminal 50 is connected through the selector switch 24 to the output of the flipflop 22, to thus have the 30 cycle square wave signal applied thereto. The capacitor 49, together with the diodes 45 and 48 and the resistor 44, develop a negative differentiated pulse at the circuit point 43 during each cycle, provided that the signal is not then shorted out by engagement of the brush 37 with the semi-annular member 35 of the slip ring assembly 11.

Circuit point 43 is connected to the base of a transistor 51 having an emitter connected through a resistor 52 to ground and having a collector connected through a diode 53 and through a primary winding 54 of a transformer 55 to a power supply terminal 56, the collector being also connected through a resistor 57 to a terminal 58. The transformer 55 has a secondary winding 60 having one terminal connected through resistors 61 and 62 to the base electrodes of a pair of transistors 63 and 64 having emitters connected together and to the other terminal of the secondary winding 60. The collector of the transistor 63 is connected through a capacitor 65 to the power supply terminal 56, and through a resistor 66 to a circuit point 67 which is connected through a capacitor 68 to the terminal 56 and through a resistor 70 to a circuit point 71 connected to ground through a diode 72 and connected through a capacitor 73 to an output terminal 74.

The collector of transistor 64 is connected through a resistor 75 to the terminal 58 and is connected directly to a terminal 76 to which a 60-cycle sine wave signal is applied from the phase adjust circuit 30. The collector of the transistor 64 and the terminal 76 are connected through a resistor 77 to a circuit point 78 which is connected through a resistor 79 to the terminal 56, through a resistor 80 and a capacitor 81 to ground, and through a resistor 82 to the circuit point 71.

In operation, when a negative pulse is applied to the base of the transistor 51, it conducts to produce a pulse in the secondary winding 60 of the transformer 55 which is applied to the transistors 63 and 64. If at that time, the 60 cycle sine wave signal applied to the terminal 76 is of one polarity, it will tend to increase the voltage at the circuit point 71, but if the 60 cycle sine wave signal is of the opposite polarity, it will tend to decrease the voltage at the circuit point 71. The diode 72 is a variable capacitance diode and the capacitance between circuit point 71 and ground is changed in response to such a voltage variation. The terminal 74 is connected to a frequency-determining circuit of the oscillator 26 which may be a Terman type oscillator.

The diode 53 functions to damp the pulse transformer 55 while resistors 61 and 62 are protective resistors which prevent the base current of the transistors 63 and 64 from becoming excessive. Capacitor 65 functions to hold the sampling voltage substantially constant during the sampling period, while resistor 66 and capacitor 68 form an integrating circuit to cut off the high frequency components of the error voltage. Terminal 58 is for testing purposes, to develop a signal which may be applied to an oscilloscope to show the feedback signal from the output of the oscillator and also the control 30 cycle pulses.

Figure 5:
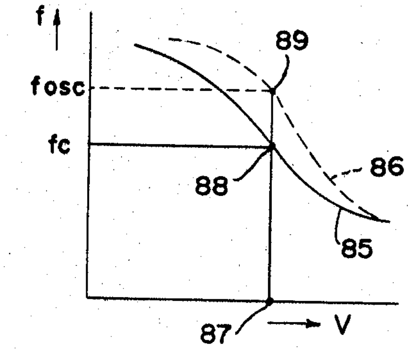
FIGURE 5 is a graph illustrating the relationship of frequency to voltage during certain conditions of operation.

In the above description of the operation of the circuit of FIGURE 4, it is assumed that the mechanical phase of rotation of the motor shaft is such that brush 37 is not engaged with the semi-annular member 35 at the time when the negative 30-cycle pulse is developed at the circuit point 43. However, if the brush 37 is engaged with the member 35 at that time, the sampling pulse is not applied to the transistor 51, and the result is that the oscillator 26 operates at a higher frequency to speed up the motor 12 until the proper phase relation is obtained. Referring to FIGURE 5, curve 85 represents the change in frequency of the oscillator as a function of voltage at the time of opening of the contacting members 35 and 37, while curve 86 shows the change in frequency as a function of the voltage at the time of short-circuiting the members 35 and 37. The voltage value indicated by reference numeral 87 represents a given bias voltage as determined by the resistors 79 and 80. The frequency is thus shifted about a center frequency $f_c$, as indicated at 88 depending upon the error voltage. When the members 35 and 37 are engaged, the frequency moves to a higher point 89, assuming the same bias voltage 87.

Figure 6:
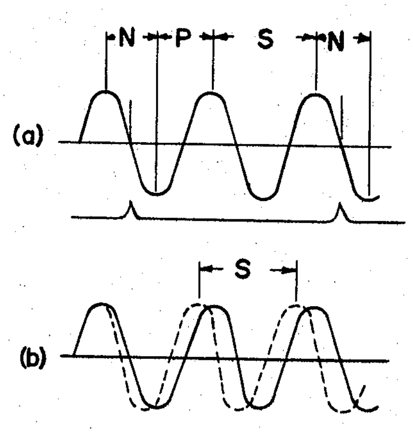
FIGURES 6(*a*) and 6(*b*) are graphs illustrating wave forms for explaining the operation of the system of FIGURE 2.

With reference to the FIGURE 6(*a*), if the frequency of the oscillator 26 becomes higher, the phase of the output of the oscillator leads the input pulse, shown in the lower part of the FIGURE 6(*a*) and is brought into a control range N from a short-circuiting period S. If the input pulse is applied within a time period P, the pulse in effect becomes a positive feedback pulse and is stabilized within the control range N.

Figure 3:
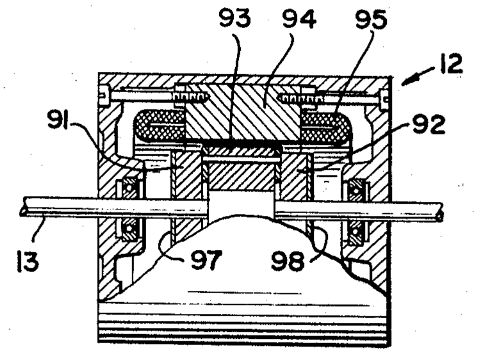
FIGURE 3 is an elevational view, partly in section, showing the construction of a synchronous motor used in the system of FIGURE 2.

FIGURE 3 illustrates the construction of the synchronous motor 12. Referring thereto, two ferrite permanent magnets 91 and 92 are provided, each magnetized with four poles being aligned in opposition, such magnets being secured on the opposite ends of a rotor 93, with the motor shaft 13 extending through the magnets 91 and 92 and rotor 93, and being secured thereto. A suitable stator 94 is provided with four poles, and 90 degree phase windings 95 thereon.

A pair of balancing plates 97 and 98 are provided, and a suitable air gap is formed in between the permanent magnets 91 and 92 and the stator 94 to obtain the desired starting characteristics and phase accuracy. The rotor 93 is provided with the conventional squirrel cage structure and if the permanent magnets 91 and 92 were removed, the motor would operate as a conventional induction motor. However, when combined with the permanent magnets 91 and 92, the motor has a torque-speed characteristic which is substantially the same as that of a conventional synchronous motor operating at a load torque less than a certain value, and the motor operates to maintain a predetermined phase relation between the alternating current applied thereto and the mechanical phase relation of the motor shaft. However, since the motor is a four pole motor, two synchronized positions are possible.

By way of illutsrative example and not by way of limitation the components of the circuit of FIGURE 4 may have the following values:

| Reference numeral: | | Value |
|---|---|---|
| 41 | | 10K. |
| 42 | microfarads | 10 |
| 44 | | 10K. |
| 49 | microfarad | 0.01 |
| 52 | ohms | 150 |
| 57 | | 120K. |
| 61, 62 | | 1.2K. |
| 65 | microfarads | 2 |
| 66 | | 56K. |
| 68 | microfarad | 0.2 |
| 70 | | 270K. |
| 73 | microfarad | 0.03 |
| 75 | | 33K. |
| 77 | | 4.7K. |
| 79 | | 27K. |
| 80 | | 1.2K. |
| 81 | microfarads | 30 |
| 82 | | 330K. |

It will be understood that modification and variations may be effected without departing from the spirit and scope of the novel concepts of this invention.

We claim as our invention:

1. In a system for rotating an element in phase-lock relationship with a cyclic control signal such that, when synchronized, said element is at a certain angular position when said control signal is at a certain point in the cycle thereof; a synchronous motor; means for applying to said motor an AC current synchronized with said control signal and at a frequency equal to an integer multiple of the frequency of said control signal; means for mechanically coupling said motor to drive said element through one complete revolution during each cycle of said control signal; sampling means for developing a sampling signal responsive to the phase of rotation of said element; means for comparing said sampling signal with said cyclic control signal; means responsive to said comparing means for temporarily shifting the frequency of said AC current in the absence of a predetermined phase relationship between said sampling and control signals; said sampling means comprising: mating arcuate segments of conductive and non-conductive material together defining an annular ring, means supporting said annular ring for rotation with said elements, and fixed brush means engaging said annular ring to alternately engage said arcuate segments thereof.

2. In a system as defined in claim 1, said sampling means further comprising an additional annular ring of conductive material electrically connected to said arcuate segments of conductive material, means for supporting said additional annular ring for rotation with said elements, and additional brush means engaging said additional annular ring.

3. In a system for rotating an element in phase-locked relation to a cyclic control signal such that said element is at a certain angular position when said control signal is at a certain point in the cycle thereof, a synchronous motor drivingly coupled to said element, oscillator means for developing an AC signal, amplifier means responsive to said AC signal to apply a corresponding AC current to said motor, means for developing a feedback AC signal from said oscillator, phase comparator means responsive to said control signal and said feedback signal to control said oscillator means and synchronize said AC current with said control signal, the frequency of said oscillator being shifted in one direction in the absence of application of said control signal to said phase comparator means, and means for cutting off application of said control signal to said phase comparator means when the rotation of said element is out of said phase-locked relation to said control signal.

4. In a magnetic recording and reproducing system including a rotatable head assembly having a pair of diametrically opposite magnetic heads for tracing tracks on a moving magnetic tape on which a cyclic control signal is recorded, wherein one cycle of said control signal corresponds to one revolution of said head assembly, a synchronous motor for driving said head assembly, means for applying AC current to said motor at a frequency twice that of said control signal, synchronizing means responsive to said control signal for synchronizing said AC current with said control signal, and shorting means for cutting off application of said control signal to said synchronizing means during a certain portion of each revolution of said head assembly.

References Cited

UNITED STATES PATENTS 3,175,034 3/1965 Kihara ------------- 178—6.6

ROBERT L. GRIFFIN, *Primary Examiner.*

HOWARD W. BRITTON, *Assistant Examiner.*

U.S. Cl. X.R.

179—100.2; 318—314